United States Patent [19]

Parsnick et al.

[11] Patent Number: 5,235,816
[45] Date of Patent: Aug. 17, 1993

[54] CRYOGENIC RECTIFICATION SYSTEM FOR PRODUCING HIGH PURITY OXYGEN

[75] Inventors: David R. Parsnick, Tonawanda; James R. Dray, Kemore, both of N.Y.

[73] Assignee: Praxair Technology, Inc., Danbury, Conn.

[21] Appl. No.: 774,213

[22] Filed: Oct. 10, 1991

[51] Int. Cl.$^5$ .................................................. F25J 3/04
[52] U.S. Cl. ............................................... 62/22; 62/24; 62/38
[58] Field of Search .......................... 62/22, 24, 38

[56] References Cited

U.S. PATENT DOCUMENTS

| | | | |
|---|---|---|---|
| 3,447,331 | 6/1969 | Smith | 62/22 |
| 3,688,513 | 9/1972 | Streich et al. | 62/22 |
| 4,433,990 | 2/1984 | Olszewski | 62/22 |
| 4,533,375 | 8/1985 | Erickson | 62/22 |
| 4,578,095 | 3/1986 | Erickson | 62/22 |
| 4,790,866 | 12/1988 | Rathbone | 62/22 |
| 4,822,395 | 4/1989 | Cheung | 62/22 |
| 4,838,913 | 6/1989 | Victor et al. | 62/22 |
| 4,932,212 | 6/1990 | Rohde | 62/22 |
| 4,935,446 | 6/1990 | Schoenpflug | 62/22 |
| 5,019,144 | 5/1991 | Victor et al. | 62/22 |
| 5,019,145 | 5/1991 | Rohde et al. | 62/22 |
| 5,034,043 | 7/1991 | Rottmann | 62/22 |

*Primary Examiner*—Ronald C. Capossela
*Attorney, Agent, or Firm*—Stanley Ktorides

[57] ABSTRACT

A cryogenic rectification system wherein refrigeration within crude argon is recovered by heat exchange with feed and is carried with the feed into the main column system to improve the recovery of high purity oxygen product.

10 Claims, 3 Drawing Sheets

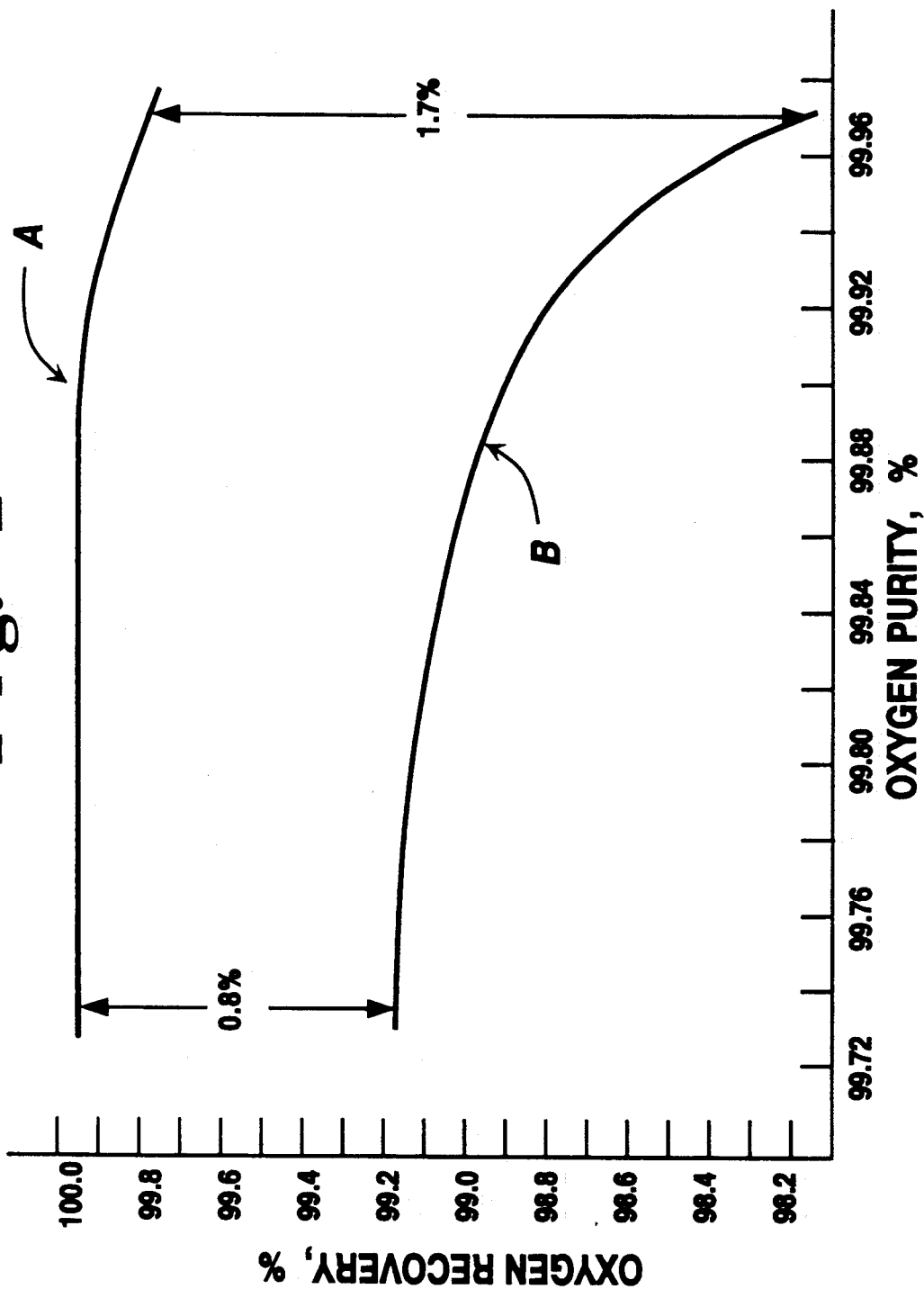

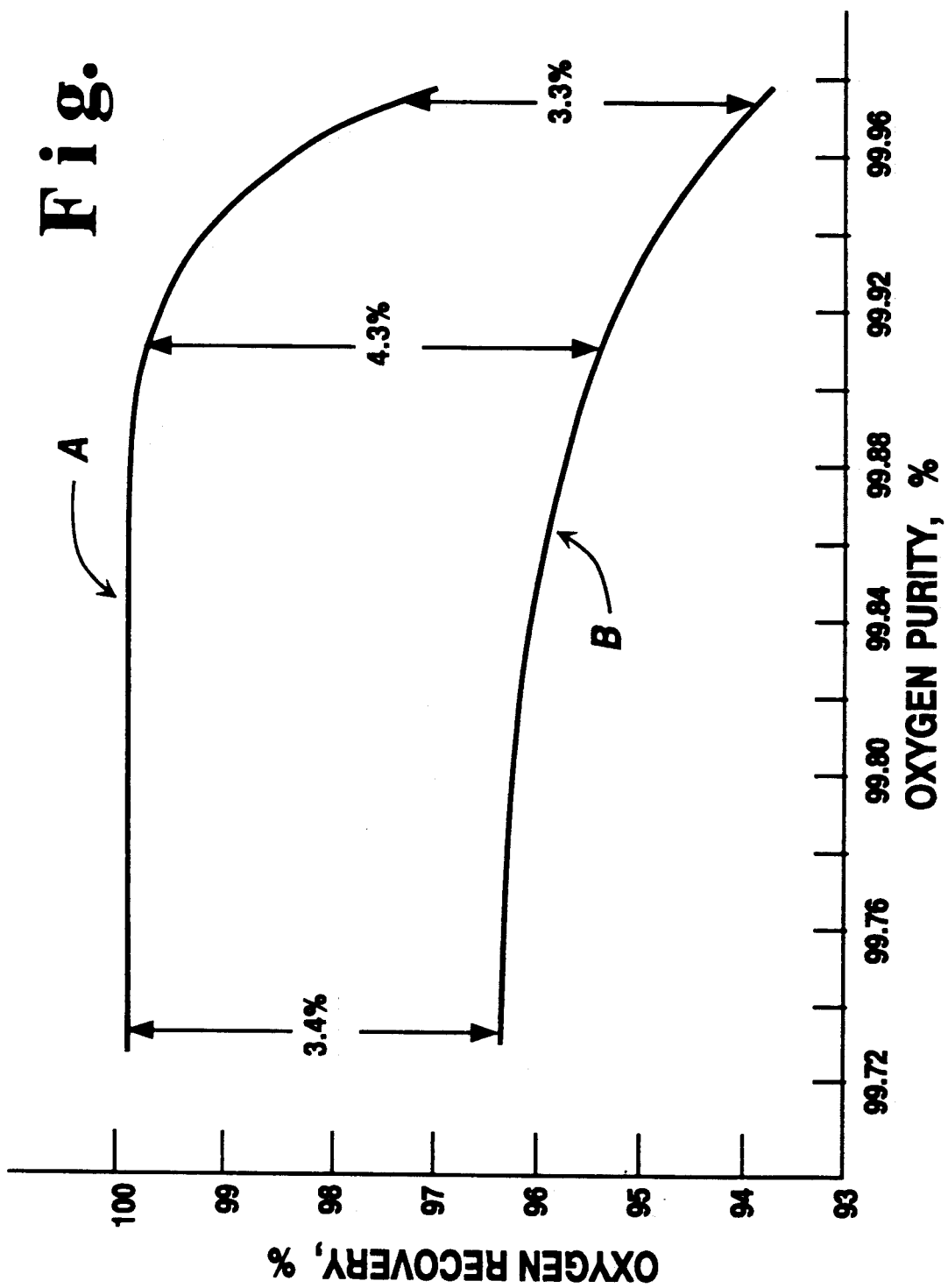

CRYOGENIC RECTIFICATION SYSTEM FOR PRODUCING HIGH PURITY OXYGEN

TECHNICAL FIELD

This invention relates generally to the cryogenic rectification of mixtures comprising oxygen, nitrogen and argon, e.g., air, and more specifically to the production of high purity oxygen by use of such cryogenic rectification.

BACKGROUND ART

An often used commercial system for the separation of a mixture comprising oxygen, nitrogen and argon, e.g. air, is cryogenic rectification. A valuable product produced by such cryogenic rectification is high purity oxygen. However generally in the production of high purity oxygen by cryogenic rectification, as the oxygen purity increases, the yield or recovery of the oxygen decreases. The recovery of high purity oxygen by means of cryogenic rectification may be improved by adding additional stages to the cryogenic rectification column system. However, this procedure increases both the capital and the operating costs of the cryogenic rectification system, especially if trayed column sections are used.

Accordingly it is an object if this invention to provide an improved cryogenic rectification method for producing high purity oxygen with improved recovery.

It is another object of this invention to provide an improved cryogenic rectification apparatus by which high purity oxygen may be recovered with improved recovery.

SUMMARY OF THE INVENTION

The above and other objects which will become apparent to one skilled in the art upon a reading of this disclosure are attained by the present invention one aspect of which is:

Cryogenic rectification method for producing high purity oxygen with improved recovery comprising:

(A) cooling a feed comprising oxygen, nitrogen and argon and introducing the feed into a main column system comprising at least two columns;

(B) separating said feed by cryogenic rectification in said main column system into nitrogen-rich and oxygen-rich components;

(C) passing fluid comprising argon and oxygen from the main column system into an argon column as argon column feed and separating said argon column feed by cryogenic rectification in said argon column into crude argon and oxygen-enriched fluid;

(D) passing oxygen-enriched fluid into the main column system and recovering high Purity oxygen from the main column system; and (E) passing crude argon in indirect heat exchange with feed to carry out the cooling of step (A).

Another aspect of the invention is:

Cryogenic rectification apparatus comprising:

(A) (1) a main column system comprising at least two columns, (2) an argon column, (3) means for providing fluid from the main column system into the argon column, and (4) means for providing fluid from the argon column into the main column system;

(B) a main heat exchanger, means for providing fluid from the main heat exchanger into the main column system, and means for providing fluid from the argon column to the main heat exchanger; and (C) means for recovering fluid from the main column system.

As used herein the term "high purity oxygen" means a fluid having an oxygen concentration of at least 99.6 percent.

As used herein the term "crude argon" means a fluid having an argon concentration of at least 90 percent.

As used herein the term, "column", means a distillation or fractionation column or zone, i.e., a contacting column or zone wherein liquid and vapor phases are countercurrently contacted to effect separation of a fluid mixture, as for example, by contacting of the vapor and liquid phases on a series or vertically spaced trays or plates mounted within the column and/or on packing elements which may be structured and/or random packing elements. For a further discussion of distillation columns see the Chemical Engineers' Handbook. Fifth Edition, edited by R. H. Perry and C.H. Chilton, McGraw-Hill Book Company, New York, Section 13, "Distillation" B. D. Smith et al, page 13-3, *The Continuous Distillation Process*. The term, double column is used to mean a higher pressure column having its upper end in heat exchange relation with the lower end of a lower pressure column. A further discussion of double columns appears in Ruheman "The Separation of Gases" Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns. Cryogenic rectification is a rectification process carried out, at least in part, at low temperatures, such as at temperatures at or below 250 degrees K.

As used herein the term "indirect heat exchange" means the bringing of two fluid streams into heat exchange relation without any physical contact or intermixing of the fluids with each other.

As used herein the term "argon column" means a system comprising a column and a top condenser which processes a feed comprising argon and produces a product having an argon concentration which exceeds that of the feed.

BRIEF DESCRIPTION OF THE DRAWINGS

FIG. 2 is a graphical representation of a comparison of the results attained by the practice of this invention with the results attained with one conventional system without use of an argon column.

FIG. 3 is a graphical representation of another comparison of the results attained by the practice of this invention with the results attained with one conventional system without use of an argon column.

DETAILED DESCRIPTION

Figure 1:
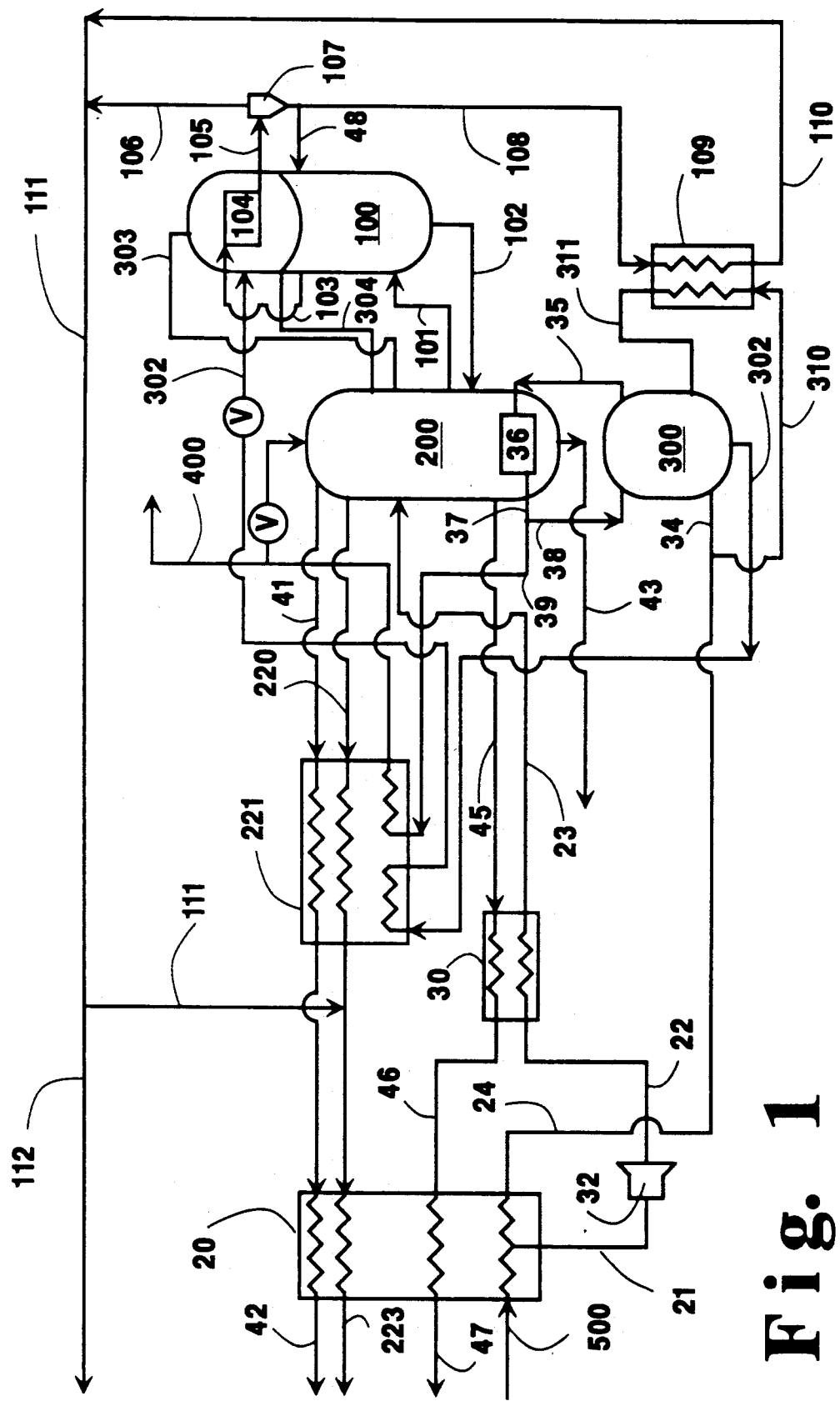
FIG. 1 is a schematic representation of one preferred embodiment of the invention.

The invention will be described in detail with reference to the Drawings.

Referring now to FIG. 1, feed 500, such as air, comprising oxygen, nitrogen and argon is cooled by passage through main heat exchanger 20 by indirect heat exchange with return streams as will be more fully described later. A first portion 21 of the feed is passed through turboexpander 32 to generate refrigeration and the resulting stream 22 is passed through heat exchanger 30 and then as stream 23 into lower pressure column 200. A second portion 24 of the feed is divided into part 34 and part 310. Part 34 is passed into high pressure column 300 of the main column system which comprises at least two columns. High pressure column 300 is operating at a pressure generally within the range of from 65 to 90 pounds per square inch absolute (psia). In the embodiment illustrated in FIG. 1 the main column system comprises a double column system comprising high pressure column 300 and low pressure column 200. Other examples of a main column system which may be used in the practice of this invention include two or more columns in series. Second part 310 is cooled by indirect heat exchange with crude argon by the downstream passage through heat exchanger or argon column boiler 109. Resulting stream 311 is then passed into higher pressure column 300.

Within high pressure column 300 the feeds into the column emanating from feed 500 are separated by cryogenic rectification into nitrogen-richer vapor and oxygen-richer liquid. Oxygen-richer liquid 302 is removed from high pressure column 300, cooled by indirect heat exchange by partial traverse through heat exchanger 221 and passed into top condenser 104 of argon column 100 wherein it is partially vaporized against condensing crude argon. The resulting oxygen-richer vapor and remaining oxygen-richer liquid are passed as streams 303 and 304 respectively into low pressure column 200 which is operating at a pressure less than that of high pressure column 300 and generally within the range of from 16 to 25 psia.

Nitrogen-richer vapor is passed as stream 35 into main condenser 36 wherein it is condensed while serving to reboil low pressure column 00 bottoms. Resulting condensed nitrogen-richer liquid 37 is passed out of main condenser 36 and a portion 38 is Passed into high pressure column 300 as reflux. Another portion 39 of the nitrogen-richer liquid is cooled by partial traverse through heat exchanger 221 and is passed into low pressure column 200 as reflux. If desired, a portion 400 of stream 39 may be recovered as product liquid nitrogen having a concentration generally exceeding 99.95 percent.

Within low pressure column 200 the feeds are separated by cryogenic rectification into nitrogen-rich and oxygen-rich components. Nitrogen-rich component is removed from column 200 as stream 41, warmed by passage through heat exchangers 221 and 20, and may be recovered as product nitrogen gas 42 having a nitrogen concentration generally exceeding 99.98 percent. A waste stream 220 is removed from column 200 at a point below the point where stream 41 is removed, is warmed by passage through heat exchangers 221 and 20, and is passed out of the system as stream 223 which is generally released to the atmosphere.

Oxygen-rich component is removed from column 200 and recovered as high purity oxygen product. In the embodiment illustrated in FIG. 1, high purity oxygen liquid stream 43 is removed from column 200 and recovered. High purity oxygen vapor stream 45 is warmed by passage through heat exchanger 30 and resulting high purity oxygen vapor 46 is warmed by passage through main heat exchanger 20 and is recovered as high purity oxygen product 47.

A fluid stream 101 comprising oxygen and argon is passed from low pressure column 200 into argon column 100 wherein it is separated by cryogenic rectification into oxygen-enriched fluid and into crude argon. Oxygen-enriched fluid is passed as stream 102 from argon column 100 into low pressure column 200. Crude argon vapor is passed as stream 103 into argon column top condenser 104 wherein it is partially condensed against partially vaporizing oxygen-richer liquid 302 as was previously described. Resulting two phase crude argon stream 105 is passed into phase separator 107 wherein it is separated into vapor 106 and liquid 108. A portion 48 of the liquid is returned to argon column 100 as reflux. Vapor stream 106 may be vented to the atmosphere or, if the pressure at the top of column 100 is sufficient, the refrigeration in vapor stream 106 may be recovered by passing it through heat exchanger 20. For cases in which the pressure is not sufficient, liquid stream 108 is pressurized, such as by liquid head, and is vaporized by indirect heat exchange through heat exchanger 109 against downstream feed stream 310 as was previously described. The refrigeration of the resulting vapor stream 110 is then recovered in heat exchanger 20. The embodiment illustrated in FIG. 1 shows both of these alternatives wherein vapor stream 106 and 110 combine to form crude argon vapor stream 111. It is understood, however, that stream 111 could also come totally from either stream 106 or stream 110.

In one alternative embodiment of the invention, crude argon vapor stream 103 is totally condensed in top condenser 104 thus eliminating the need for phase separator 107 and stream 106.

Crude argon vapor is warmed by indirect heat exchange with incoming feed in main heat exchanger 20 so as to cool the incoming feed. Preferably, as illustrated in FIG. 1, stream 111 is combined with waste stream 220 prior to serving to cool the feed. Alternatively, stream 111 may be passed separately through heat exchanger 20, whereupon some or all of stream 111 may be recovered and further processed. If desired, a portion 112 of crude argon stream 111, may be recovered without passage through heat exchanger 20 and passed through one or more further separation steps to produce refined argon.

With the practice of this invention the refrigeration within crude argon produced by the argon column is not lost but rather is passed into the incoming feed from where it is passed into the main column system to drive the cryogenic rectification. If employed, the heat exchange in heat exchanger 109 serves to further capture refrigeration from the crude argon and deliver it into the main column system. This recovered refrigeration reduces the amount of refrigeration which would otherwise be required to be provided into the main column system such as by the turboexpansion of feed air into the lower pressure column. Reducing upper column turbine air results in increased oxygen recovery by increasing the reflux ratio in the upper section of the upper column. The reflux ratio increases because the flow to the lower column is higher, resulting in a flow increase of the reflux to the lower column. The flow reduction of the feed to the upper column also reduces the vapor flow in the top section of the upper column.

FIG. 2 illustrates in graphical form a calculated example of the invention wherein no crude argon is recovered and a liquid nitrogen stream equal to one percent of the total feed air is recovered. The product oxygen recovery is measured on the vertical axis and the product oxygen purity is measured on the horizontal axis. Oxygen recovery may be defined as the ratio of oxygen contained in the product oxygen to the quantity of oxygen contained in the feed to the plant.

Curve A represents the results attained with the practice of this invention. Curve B represents, for comparative purposes, the calculated results attained with a conventional double column system without argon recovery. In both cases the data was calculated with respect to a double column system wherein the low pressure column employs structured packing and has 60 stages below the waste stream removal point. As can be seen from FIG. 2, the invention enables a 0.8 percentage point increase in oxygen recovery at a purity of 99.74 percent over that attainable with the conventional system. Furthermore the recovery advantage of the invention increases to 1.7 percentage points when the oxygen product purity is increased to 99.97 percent.

The calculated example and comparative example described above were repeated except that the liquid nitrogen recovery was increased to be 4.5 percent of feed air and the results are illustrated graphically in FIG. 3. As can be seen from FIG. 3, the invention enables a 3.4 percentage point increase in oxygen recovery at a purity of 99.74 percent over that attainable with the conventional system and the recovery advantage increases to 4.3 percentage points at an oxygen purity of 99.90 percent. Thereafter the advantage drops off somewhat at higher purities; however the advantage remains substantial.

Now, by the use of the cryogenic rectification system of this invention, one can increase the recovery of high purity oxygen without requiring the employment of additional stages in the main column system. Although the invention has been described in detail with reference to a certain preferred embodiment, these skilled in the art will recognize that there are other embodiments of the invention within the spirit and the scope of the claims.

We claim :

1. Cryogenic rectification method for producing high purity oxygen with improved recovery comprising:
   (A) cooling feed comprising oxygen, nitrogen and argon and introducing the feed into a main column system comprising at least two columns;
   (B) separating said feed by cryogenic rectification in said main column system into nitrogen-rich and oxygen-rich components;
   (C) passing fluid comprising argon and oxygen from the main column system into an argon column as argon column feed and separating said argon column feed by cryogenic rectification in said argon column into crude argon and oxygen-enriched fluid;
   (D) passing oxygen-enriched fluid into the main column system and recovering high purity oxygen from the main column system;
   (E) withdrawing a waste stream from the main column system; and
   (F) passing crude argon into the withdrawn waste stream to form a combined stream and passing the combined stream in indirect heat exchange with feed to carry out the cooling of step (A).

2. The method of claim 1 wherein at least some of the crude argon is recovered after the heat exchange with the feed.

3. The method of claim 1 further comprising vaporizing liquid crude argon by indirect heat exchange with a downstream portion of the feed prior to passing the crude argon in said indirect heat exchange with the feed.

4. The method of claim 1 further comprising recovering nitrogen-rich component as product nitrogen.

5. The method of claim 1 further comprising recovering liquid nitrogen from the main column system.

6. Cryogenic rectification apparatus comprising:
   (A) (1) a main column system comprising at least two columns, (2) an argon column, (3) means for providing fluid from the main column system into the argon column, and (4) means for providing fluid from the argon column into the main column system;
   (B) a main heat exchanger, means for providing fluid from the main heat exchanger into the main column system, means for passing waste fluid from the main column system to the main heat exchanger, and means for providing fluid from the argon column into said waste fluid passing means before the main heat exchanger; and
   (C) means for recovering fluid from the main column system.

7. The apparatus of claim 6 further comprising an argon column boiler, means to pass feed to the argon column boiler and from the argon column boiler to the main column system, and means to pass fluid from the argon column to the argon column boiler and from the argon column boiler to the main heat exchanger.

8. The apparatus of claim 6 wherein the main column system comprises a double column.

9. Cryogenic rectification method for producing high purity oxygen with improved recovery comprising:
   (A) cooling a feed comprising oxygen, nitrogen and argon and introducing the feed into a main column system comprising at least two columns;
   (B) separating said feed by cryogenic rectification in said main column system into nitrogen-rich and oxygen-rich components;
   (C) passing fluid comprising argon and oxygen from the main column system into an argon column as argon column feed and separting said argon column feed by cryogenic rectification in said argon column into crude argon and oxygen-enriched fluid;
   (D) passing oxygen-enriched fluid into the main column system and recovering high purity oxygen from the main column system;

(E) passing crude argon in indirect heat exchange with feed to carry out the cooling of step (A); and (F) vaporizing liquid crude argon by indirect heat exchange with a downstream portion of the feed prior to passing the crude argon in said indirect heat exchange with the feed.

10. Cryogenic rectification apparatus comprising:
(A) (1) a main column system comprising at least two columns, (2) an argon column, (3) means for providing fluid from the main column system into the argon column, and (4) means for providing fluid from the argon column into the main column system;

(B) a main heat exchanger, means for providing fluid from the main heat exchanger into the main column system, and means for providing fluid from the argon column to the main heat exchanger;

(C) means for recovering fluid from the main column system; and (D) an argon column boiler, means for passing feed to the argon column boiler and from the argon column boiler to the main column system, and means for passing fluid from the argon column to the argon column boiler and from the argon column boiler to the main heat exchanger.

* * * * *

UNITED STATES PATENT AND TRADEMARK OFFICE
CERTIFICATE OF CORRECTION

PATENT NO. : 5,235,816
DATED : August 17, 1993
INVENTOR(S) : D.R. Parsnick etal

It is certified that error appears in the above-identified patent and that said Letters Patent is hereby corrected as shown below:

In column 1, line 56 delete "Purity" and insert therefor --purity--.

In column 3, line 57 delete "00" and insert therefor --200--.

In column 3, line 59 delete "Passed" and insert therefor --passed--.

Signed and Sealed this

Fifth Day of April, 1994

Attest:

BRUCE LEHMAN

Attesting Officer    Commissioner of Patents and Trademarks